United States Patent
Harris et al.

(10) Patent No.: US 6,209,206 B1
(45) Date of Patent: Apr. 3, 2001

(54) METHOD OF PRODUCING SPLIT COMPOSITE SPHERICAL BEARING

(75) Inventors: Bernard Harris, Northbrook; Dennis E. Bozych, Downers Grove; Jeffrey R. Scholbe, Lisle, all of IL (US)

(73) Assignee: Rexnord Corporation, Milwaukee, WI (US)

( * ) Notice: Subject to any disclaimer, the term of this patent is extended or adjusted under 35 U.S.C. 154(b) by 0 days.

(21) Appl. No.: 09/504,094

(22) Filed: Feb. 14, 2000

Related U.S. Application Data

(62) Division of application No. 09/080,314, filed on May 15, 1998, now Pat. No. 6,068,405.

(51) Int. Cl.$^7$ .............. B21D 53/10; B21K 1/10
(52) U.S. Cl. .............. 29/898.043; 384/208; 29/898.056; 29/898.059
(58) Field of Search ............ 29/898.04, 898.043, 29/898.047, 898.048, 898.059, 898.1, 898.054, 898.056; 384/145, 146, 206, 208, 213

(56) References Cited

U.S. PATENT DOCUMENTS

| | | | |
|---|---|---|---|
| 2,621,088 | * 12/1952 | Cole | 29/898.043 |
| 3,084,417 | 4/1963 | Picca | 29/149.5 |
| 3,126,613 | * 3/1964 | Litsky | 29/898.047 |
| 3,191,265 | * 6/1965 | McCloskey | 29/898.047 |
| 3,266,123 | * 8/1966 | McCloskey | 29/898.047 |
| 3,452,415 | * 7/1969 | Beazley et al. | 29/898.047 |
| 3,528,710 | * 9/1970 | Roesner et al. | 29/898.047 |
| 3,562,885 | * 2/1971 | McCloskey | 29/898.047 |
| 3,616,000 | 10/1971 | Butzow et al. | 156/173 |
| 3,700,295 | 10/1972 | Butzow et al. | 308/72 |
| 3,769,672 | * 11/1973 | Eklund | 29/898.01 |
| 3,874,050 | * 4/1975 | White | 29/898.047 |
| 3,934,958 | * 1/1976 | Turner | 29/898.047 |
| 3,974,009 | 8/1976 | Butzow et al. | 156/84 |
| 4,251,122 | 2/1981 | McCloskey | 308/72 |
| 5,265,965 | 11/1993 | Harris et al. | 384/208 |
| 5,288,354 | 2/1994 | Harris et al. | 156/154 |
| 5,407,508 | 4/1995 | Harris et al. | 156/173 |

FOREIGN PATENT DOCUMENTS

| | | | | |
|---|---|---|---|---|
| 0913595 | 5/1999 | (EP) | | F16C/11/06 |
| 2155539 | 9/1985 | (GB) | | F16C/11/08 |
| 0500244 | * 1/1956 | (IT) | | 29/898.043 |

* cited by examiner

Primary Examiner—S. Thomas Hughes
Assistant Examiner—Marc W. Butler
(74) Attorney, Agent, or Firm—Quarles & Brady LLP

(57) ABSTRACT

A method of making a spherical bearing including the steps of forming an outer bearing member with an inner concave spherical bearing surface, forming a second member with an outer convex spherical bearing surface, cutting the second member along a diametric plane to provide first and second inner bearing segments respectively including first and second outer spherical bearing surface segments, inserting the first inner bearing segment within the outer bearing member so as to fully engage the first outer spherical bearing surface segment with the inner concave spherical bearing surface, and inserting the second inner bearing segment within the outer bearing member so as to fully engage the second outer spherical bearing surface segment with the inner concave spherical bearing surface.

15 Claims, 2 Drawing Sheets

METHOD OF PRODUCING SPLIT COMPOSITE SPHERICAL BEARING

CROSS-REFERENCE TO RELATED APPLICATIONS

This application is a divisional application of U.S. patent application Ser. No. 09/080,314 filed on May 15, 1998 now U.S. Pat. No. 6,068,405.

BACKGROUND OF THE INVENTION

The invention relates generally to self-aligning and self-lubricating spherical bearings.

More particularly, the invention relates to bearings comprising one composite race or member including a bearing surface fabricated, at least in part, of self-lubricating material and a supporting portion fabricated from fiberglass filaments and resin.

In the past, inner races or bearing members including two truncated hemispherical metallic segments having convex bearing surfaces provided with lubricating grooves were known. These inner bearing members cooperated with outer metallic races or bearing members to provide bearing assemblies which were relatively heavy and therefore not suitable for installations where total weight was a consideration.

Also in the past, bearing assemblies included bearing members with entry slots, or bearing members with spherical balls provided with flats, were sometimes employed. However, these bearing assemblies were limited in load carrying capacity.

Attention is directed to the following U.S. Patents:

U.S. Pat. No. 5,265,965, issued Nov. 30, 1993
U.S. Pat. No. 5,288,354, issued Feb. 22, 1994
U.S. Pat. No. 3,616,000, issued Oct. 26, 1971
U.S. Pat. No. 3,700,295, issued Oct. 24, 1972
U.S. Pat. No. 3,974,009, issued Aug. 10, 1976
U.S. Pat. No. 5,407,508, issued Apr. 18, 1995

SUMMARY OF THE INVENTION

The invention provides a method of making a spherical bearing including the steps of forming an outer bearing member with an inner concave spherical bearing surface, forming a second member with an outer convex spherical bearing surface of self-lubricating material, cutting the second member along a diametric plane to provide first and second inner bearing segments respectively including first and second outer spherical bearing surface segments, inserting the first inner bearing segment within the outer bearing member so as to fully engage the first outer spherical bearing surface segment with the inner concave spherical bearing surface, and inserting the second inner bearing segment within the outer bearing member so as to fully engage the second outer spherical bearing surface segment with the inner concave spherical bearing surface.

The invention also provides a method of making a spherical bearing comprising the steps of forming an outer bearing member with spaced and parallel side faces and an inner concave spherical bearing surface extending between the side faces of the outer bearing member, forming a second member with spaced and parallel side faces and an outer convex spherical bearing surface fabricated of self-lubricating material and extending between the side faces of the second member, cutting the second member along a diametric plane extending perpendicularly to the side faces thereof to provide first and second bearing segments respectively including first and second spaced and parallel side faces segments, first and second end faces extending between the side face segments, and first and second outer truncated spherical bearing surface segments extending between the side face segments and the end faces, inserting the first bearing segment within the outer bearing member in a direction perpendicular to the side faces of the outer bearing member and with the spaced and parallel sides of the first bearing segment in generally perpendicular relation to the spaced and parallel sides of the outer bearing member and so as to partially engage the first outer spherical bearing surface segment with the inner concave spherical bearing surface, rotating the first bearing segment within the outer bearing member so as to locate the spaced and parallel sides of the first bearing segment in parallel relation to the spaced and parallel sides of the outer bearing member and so as to fully engage the first outer spherical bearing surface segment with the inner concave spherical bearing surface, inserting the second bearing segment within the outer bearing member in a direction perpendicular to the side faces of the outer bearing member and with the spaced and parallel sides of the second bearing segment in generally perpendicular relation to the spaced and parallel sides of the outer bearing member and with the end faces of the second bearing segment in generally coplanar and spaced relation to the end faces of the first bearing segment and so as to partially engage second outer spherical bearing surface segment with the inner concave spherical bearing surface, and rotating the second bearing segment within the outer bearing member so as to locate the end faces of the second bearing segment in abutting relation to the end faces of the first bearing segment and so as to fully engage the second bearing surface segment with the inner bearing surface of the outer member.

The invention also provides a spherical bearing manufactured in accordance with the methods set forth above.

The invention also provides a spherical bearing comprising an outer race member including an inner concave spherical bearing surface, a first inner bearing member extending circumferentially within the outer race member and including an outer spherical bearing surface fabricated of self-lubricating material and engaging the inner bearing surface, and a second inner bearing member extending circumferentially within the outer race member and including an outer spherical bearing surface fabricated of self-lubricating material and engaging the inner bearing surface.

The invention also provides a spherical bearing comprising an outer race member including spaced and parallel side faces, and an inner concave partially spherical bearing surface extending between the side faces of the outer bearing member, a first inner bearing member extending circumferentially within the outer race member and including spaced and parallel side faces, first and second circumferentially spaced and generally co-planar end faces extending from the side faces of the first inner bearing member, an inner concave semi-cylindrical surface extending between the end faces and the side faces of the first inner bearing member, and an outer convex partially hemi-spherical bearing surface fabricated of self-lubricating material, extending between the end faces and the side faces of the first inner bearing member, and engaging the inner bearing surface of the outer race member, and a second inner bearing member extending circumferentially within the outer race member and including spaced and parallel side faces, first and second circumferentially spaced and generally co-planar end faces extending from the side faces of the second inner bearing member, an inner concave semi-cylindrical surface extending between the end faces and the side faces of the second inner bearing member, and forming, with the inner concave semi-cylindrical surface of the first inner member, a cylindrical bore, and an outer convex partially hemispherical bearing surface fabricated of self-lubricating material, extending between the end faces and the side faces of the second inner bearing member, and forming, with the outer convex partially hemispherical bearing surface of the first inner member, an outer convex partially spherical bearing surface engaging the inner concave partially spherical bearing surface of the outer race member.

One of the objects of the invention is the provision of a bearing assembly including an inner race or bearing member made up of two composite spherical halves with a spherical, self-lubricating bearing surface on the outside, and with an inner bore having a bearing surface which can be self-lubricating, depending on the application.

Another of the objects of the invention is to improve the load capacity of the a spherical bearing by eliminating slots in the outer race and flats on the inner spherical ball.

Still another of the objects of the invention is to provide a spherical bearing assembly of lesser weight than previous spherical bearing assemblies.

Another of the objects of the invention is to provide a self-lubricated inner spherical bearing member which can be easily installed and removed from an outer race or bearing member without removing the outer race from the supporting housing.

Other features and advantages of the invention will become apparent to those skilled in the art upon review of the following detailed description, claims and drawings.

GENERAL DESCRIPTION OF THE DRAWINGS

Figure 1:
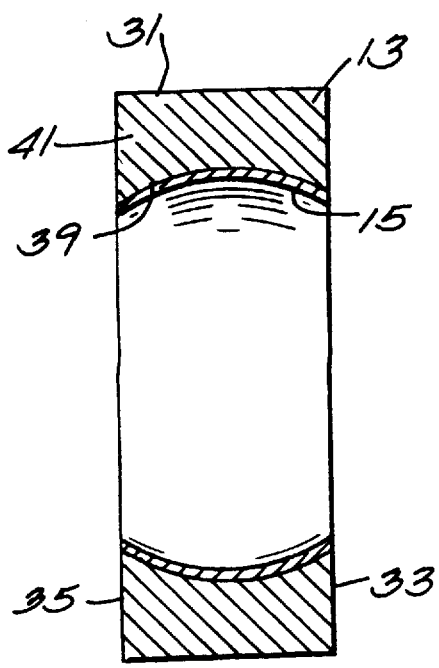
FIG. 1 is a cross-sectional view of an outer bearing or race member of one embodiment of a bearing or bearing assembly which incorporates various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 7:
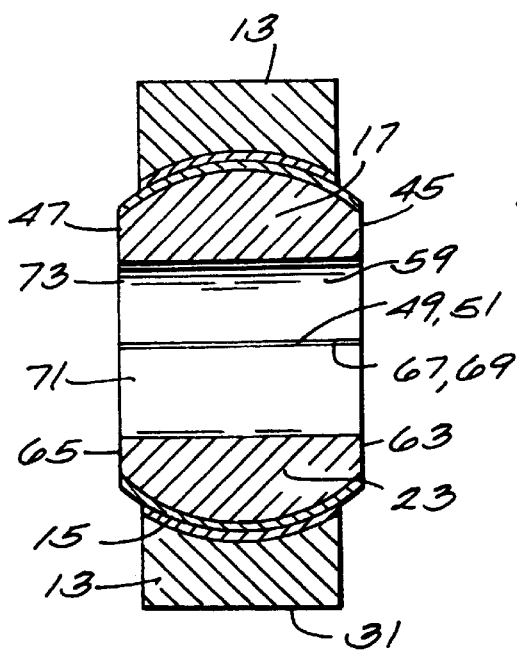
FIG. 7 is a cross-sectional view illustrating completion of the insertion of the second one of the inner bearing members into the outer bearing member and is thus also a cross-sectional view of the fully assembled bearing or bearing assembly.
Figure 8:
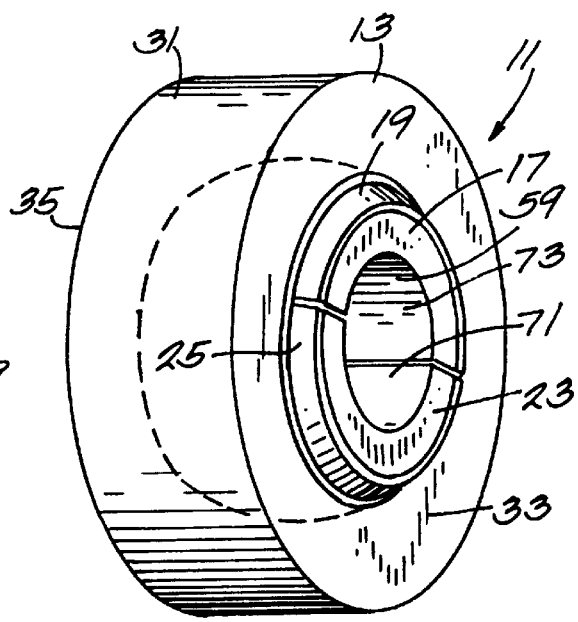
FIG. 8 is a perspective view of the fully assembled bearing or bearing assembly.

Illustrated in FIGS. 7 and 8 is one embodiment of a spherical bearing or bearing assembly 11 which incorporates various of the features of the invention and which includes an outer bearing or race member 13 including (see FIG. 1) an inner concave spherical bearing surface or surface segment 15, a first inner bearing or race member or segment 17 extending circumferentially within the outer race member 13 and including an outer partially spherical bearing surface or surface segment 19 fabricated of self-lubricating material and engaging the inner bearing surface 15, and a second inner bearing or race member or segment 23 extending circumferentially within the outer race member 13 and including an outer partially spherical bearing surface or surface segment 25 fabricated of self-lubricating material and engaging the inner bearing surface 15.

More particularly, and while other constructions can be employed, in the specifically disclosed construction, the outer bearing or race member 13 includes an outer surface 31 which is generally cylindrical, but can be of any desired configuration, together with spaced and parallel sides or side faces 33 and 35 which extend radially inwardly from the outer surface 31, and the before mentioned inner concave spherical bearing surface 15 which extends between the side faces 33 and 35 of the outer bearing or race member 13.

The outer bearing or race member 13 can be fabricated from any suitable material, such as steel or a resinous epoxy composite material, and in any suitable fashion. In particular, the inner concave spherical bearing surface 15 can be the inner surface of a metallic member, but, in the specifically disclosed construction, is shown as the inner surface of a layer 39 of self-lubricating material which is bonded to a resinous epoxy outer layer 41 and which, together with the outer layer 41, forms a composite bearing structure.

While other constructions can be employed, in the specifically disclosed construction, the first inner bearing or race member 17 extends circumferentially within the outer race member 13 and includes spaced and parallel sides or side faces 45 and 47, together with first and second circumferentially spaced and generally co-planar ends or end faces 49 and 51 extending from the side faces 45 and 47 of the first inner bearing or race member 17. In addition, the first inner bearing or race member 17 includes the before mentioned outer spherical bearing surface or surface segment 19 which is preferably fabricated of self-lubricating material, which extends between the side faces 45 and 47 and the end faces 49 and 51 of the first inner bearing or race member 17, which is partially hemispherical throughout the area between the side faces 45 and 47 and the end faces 49 and 51, and which engages the inner bearing surface 15 of the outer bearing or race member 13.

Still further in addition, the first inner bearing or race member 17 includes an inner concave semi-cylindrical surface 59 extending between the side faces 45 and 47 and the end faces 49 and 51 of the first inner bearing or race member 17.

While other constructions can be employed, in the specifically disclosed construction, the second inner bearing or race member 23 extends circumferentially within the outer bearing or race member 13 and includes spaced and parallel sides or side faces 63 and 65, together with first and second circumferentially spaced and generally co-planar ends or end faces 67 and 69 extending from the side faces 63 and 65 of the second inner bearing or race member 23. In addition, the second inner bearing or race member 23 includes the before mentioned outer spherical bearing surface or surface segments 25 which is preferably fabricated of self-lubricating material, which extends between the side faces 63 and 65 and the end faces 67 and 69 of the second inner bearing or race member 23, which is partially hemi-spherical throughout the area between the side faces 63 and 65 and the end faces 67 and 69 of the second inner bearing or race member 23, and which forms, with the outer convex partially hemi-spherical bearing surface 19 of the first inner bearing or race member 13, an outer convex, partially spherical bearing surface engaging the inner concave partially spherical bearing surface of the outer race member 15.

The second inner bearing or race member 23 also includes an inner concave semi-cylindrical surface 71 extending between the side faces 63 and 65 and the end faces 67 and 69 of the second inner bearing or race member 23, and forming, with the inner concave semi-cylindrical surface 59 of the first inner bearing or race member 17, a cylindrical bore 73. In other embodiments of the invention, the configuration of the inner bore 73 can be hexagonal, square, or some other geometry.

The first and second inner bearing or race members 17 and 23 are preferably fabricated in accordance with the method described hereinafter. More specifically, the spherical bearing assembly 11 is preferably formed in accordance with a preferred method which includes the step of forming the outer bearing member 13 (as shown in FIG. 1) with the inner concave, partially spherical bearing surface 15.

The step of forming the outer bearing or race member 13 can also include forming the outer bearing member 13 with the spaced and parallel side faces 33 and 35, and such that the inner concave spherical bearing surface 15 extends between the side faces 33 and 35 of the outer bearing member 13.

Figure 2:
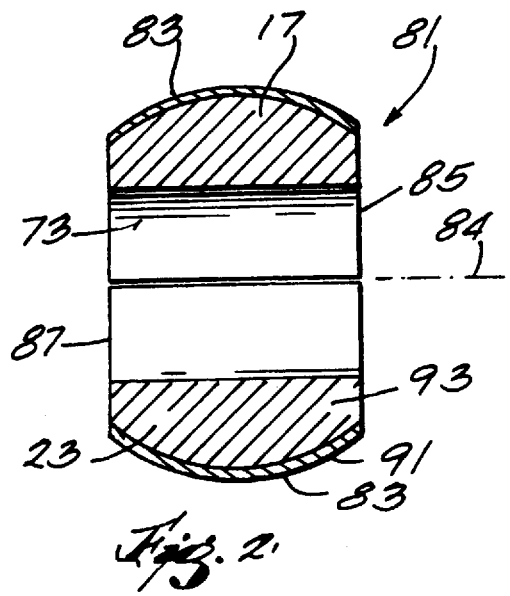
FIG. 2 is a cross-sectional view of an intermediate member which is fabricated in accordance with a method which incorporates various of the features of the invention.
Figure 3:
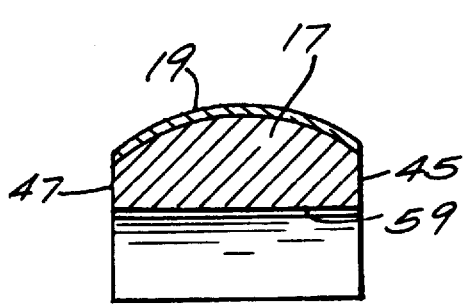
FIG. 3 is a cross-sectional view of one of the inner bearing segments employed in the bearing or bearing assembly.

The method further includes the steps of forming a second member 81 (as shown in FIG. 2) with an outer convex, partially spherical bearing surface 83 of self-lubricating material, and cutting the second member 81 along a diametric plane 84 to provide the first and second inner bearing or race members or segments 17 and 23 respectively including the first and second outer spherical bearing surfaces or segments 19 and 25. Any suitable means can be employed to cut the second member 81 along the diametrical plane. However, it is preferred to cut the second member 81 with a thin diamond coated wheel (not shown) which can be supported in any suitable manner.

The first and second inner bearing or race members 17 and 23 are thus of generally identical construction.

The step of forming the second member 81 can also include forming the second member 81, either before or after forming the outer convex spherical bearing surface 83, with spaced and parallel sides or side faces 85 and 87 such that the outer convex spherical bearing surface 83 extends throughout the area between the side faces 85 and 87 of the second member 81 and such that the cutting takes place along the diametric plane 84 which extends perpendicularly to the side faces 85 and 87.

More particularly, and while other specific methods can be employed, in the specifically disclosed method, the step of forming the second member 81 preferably includes forming the outer convex spherical bearing surface 83 of the second member 81 from self-lubricating material. While other arrangements can be employed, it is preferred to form the second member 81 as a composite of an outer layer 91 of self-lubricating material and an inner body or layer 93 of resinous epoxy material as disclosed in U.S. application Ser. No. 09/092,249, filed on Jun. 5, 1998, and now abandoned, which application is incorporated herein by reference.

In particular, in one embodiment of the method of the invention, the second member 81 can be formed, as explained in greater detail in U.S. application Ser. No. 09/092,249, by the steps of fabricating the inner supporting layer 93 of a fiberglass epoxy resin matrix which includes an outer, outwardly convex, truncated spherical surface. Thereafter, a fabric of self-lubricating material is placed on the outer, outwardly convex, truncated spherical surface of the inner supporting layer 93 to partially form the outer layer 91 of self-lubricating material. Thereafter, a layer of glass filaments and resin is placed on the outer layer 91 of self-lubricating material so as to conform the outer layer 91 of self-lubricating material to the outer, outwardly convex, truncated spherical surface of the inner supporting layer 93. Thereafter, the last mentioned layer of glass filaments and resin is cured to form an outer layer of fiberglass epoxy resin matrix and to bond the outer layer 91 of self-lubricating material to the inner supporting layer 93 of fiberglass epoxy resin matrix and to the last-mentioned outer layer of fiberglass epoxy resin matrix. Thereafter, the last-mentioned outer layer of fiberglass epoxy resin matrix is removed in any suitable manner to expose the outer layer 91 of self-lubricating material without damaging the self-lubricating material. Thereafter, the outer layer 91 of self-lubricating material is formed with the outer, outwardly convex, spherical surface 83.

As noted just above, the second member 81 is preferably formed from a resinous epoxy material including the outer layer 91 of self-lubricating material which can be formed to include the outer spherical surface 83 by any suitable technique, such as by machining or grinding, or cutting, or by any combination thereof.

The step of forming the second member 81 can also include forming the second member 81 with the bore 73 which extends perpendicularly to the side faces 85 and 87 and which can be either cylindrical or non-cylindrical, such as triangular, square, rectangular, hexagonal or other non-cylindrical bore.

The step of cutting the second member 81 can also include cutting the first and second inner bearing or race members or segments 17 and 23 to respectively include the first and second spaced and parallel side faces or face segments 45 and 47, and 63 and 65, and the first and second end faces 49 and 51 and 67 and 69 extending from the side faces or face segments, and such that the first and second outer spherical bearing surface segments 17 and 25 extend throughout the area between the side faces or face segments 45 and 47 and 63 and 65 and the end faces 49 and 51, and 67 and 69.

Figure 4:
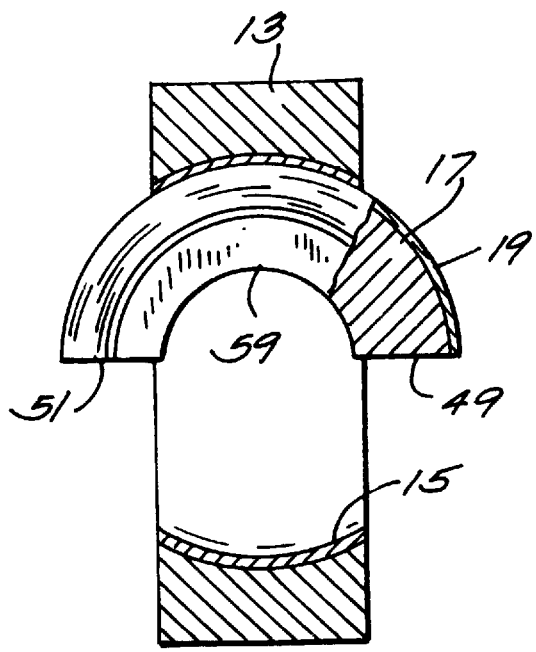
FIG. 4 is a cross-sectional view illustrating the initial insertion of one of the inner bearing members into the outer bearing member.
Figure 5:
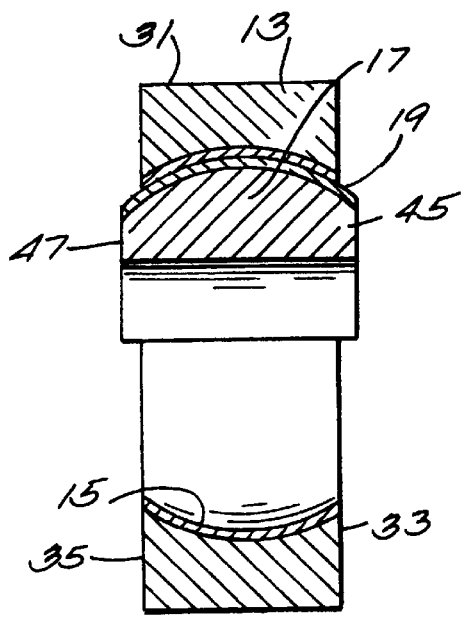
FIG. 5 is a cross-sectional view illustrating completion of the insertion of one of the inner bearing members into the outer bearing member.

Thereafter, the method includes (see FIG. 4) the step of inserting the first inner bearing or race member or segment 17 within the outer bearing member 13 so as to fully engage the first outer spherical bearing surface or surface segment 19 with the inner concave spherical bearing surface 15 of the outer bearing or race member 13.

The step of inserting the first inner bearing or race member or segment 17 includes inserting the first bearing or race member or segment 17 within the outer bearing member 13 in a direction perpendicular to the side faces 33 and 35 of the outer bearing member 13 and with the spaced and parallel sides 45 and 47 of the first inner bearing member or segment 17 in generally perpendicular relation to the spaced and parallel sides 33 and 35 of the outer bearing or race member 13 and so as to partially engage the first outer spherical bearing surface or segment 55 with the inner concave spherical bearing surface 15.

Thereafter, the first inner bearing member or segment 17 is rotated within the outer bearing member 13 so as to locate the spaced and parallel sides 45 and 47 of the first inner bearing member or segment 17 in parallel relation to the spaced and parallel sides 33 and 35 of the outer bearing member 13 and so as to fully engage the first outer spherical bearing surface with the inner concave spherical bearing surface 15 of the outer bearing or race member 13.

Figure 6:
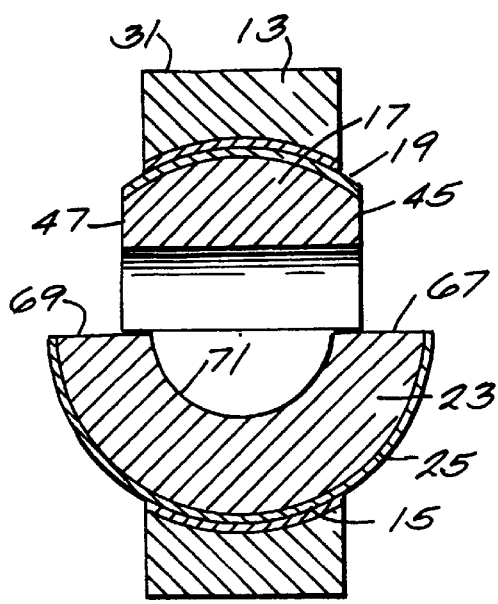
FIG. 6 is a cross-sectional view illustrating the initial of the insertion of the second one of the inner bearing members into the outer bearing member.

Thereafter, the method includes (see FIG. 6) the step of inserting the second inner bearing or race member or segment 23 within the outer bearing member 13 so as to fully engage the second outer spherical bearing surface or surface segment 25 with the inner concave spherical bearing surface 15 of the outer bearing or race member 13.

The step of inserting the second inner bearing member or segment 23 includes inserting the second inner bearing member or segment 23 within the outer bearing or race member 13 in a direction perpendicular to the side faces 33 and 35 of the outer bearing or race member 13 and with the spaced and parallel sides 63 and 65 of the second inner bearing member or segment 23 in generally perpendicular relation to the spaced and parallel sides 45 and 47 of the outer bearing or race member 13 and with the end faces 67 and 69 of the second inner bearing member or segment 23 in generally coplanar and spaced relation to the end faces 49 and 51 of the first inner bearing member or segment 17 and so as to partially engage second outer spherical bearing surface or segment 71 with the inner concave spherical bearing surface 19 of the outer bearing or race member 13.

Thereafter, the second inner bearing member or segment 23 is rotated within the outer bearing or race member 13 so as to locate the end faces 67 and 69 of the second inner bearing member or segment 23 in abutting relation to the end faces 49 and 51 of the first inner bearing member or segment 17 and so as to fully engage the second bearing surface or segment 25 with the inner bearing surface 15 of the outer bearing or race member 13.

The disclosed construction advantageously provides a self-lubricating inner spherical bearing member or race that can be easily installed and removed from an associated outer race or bearing member without taking the outer race or bearing member from the supporting housing or removing the supporting housing from the associated structure. Thus, the disclosed construction advantageously allows for installation and removal of the spherical segments of the inner race while the housing for the overall bearing assembly remains intact.

In the disclosed construction, positioning or orientation of the inner bearing segments of the disclosed construction is no longer dependent on the orientation of the load, as is the case when bearing members with entry slots are used or when bearings having spherical balls with flats are used.

In addition, the disclosed construction provides a bearing with improved load capacity because the slots in the prior outer races have been eliminated and because the flats in the prior spherical balls have been eliminated.

Another of the advantages of the disclosed construction is that (due to the elimination of the prior slots and flats) positioning of the spherical segments is no longer dependent on the orientation of the load.

Various of the features of the invention are set forth in the following claims.

What is claimed is:

1. A method of making a spherical bearing comprising the steps of forming an outer bearing member with an inner concave spherical bearing surface, forming a second member with an outer convex spherical bearing surface of self-lubricating material, cutting the second member along a diametric plane to provide first and second inner bearing segments respectively including first and second outer spherical bearing surface segments, inserting the first inner bearing segment within the outer bearing member so as to fully engage the first outer spherical bearing surface segment with the inner concave spherical bearing surface, and inserting the second inner bearing segment within the outer bearing member so as to fully engage the second outer spherical bearing surface segment with the inner concave spherical bearing surface.

2. A method in accordance with claim 1 wherein the step of forming the second member includes forming the outer convex spherical bearing surface of the second member from self-lubricating material.

3. A method in accordance with claim 1 wherein the step of forming the outer bearing member includes forming the outer bearing member with spaced and parallel side faces, and wherein the inner concave spherical bearing surface extends between the side faces of the outer bearing member.

4. A method in accordance with claim 1 wherein the step of forming the second member includes forming the second member with spaced and parallel side faces, and wherein the outer convex spherical bearing surface extends between the side faces of the second member.

5. A method in accordance with claim 4 wherein the step of forming the second member also includes forming the second member with a bore extending perpendicularly to the side faces.

6. A method in accordance with claim 4 wherein the step of forming the second member also includes forming the second member with a cylindrical bore extending perpendicularly to the side faces.

7. A method in accordance with claim 4 wherein the step of forming the second member also includes forming the second member with a non-cylindrical bore extending perpendicularly to the side faces.

8. A method in accordance with claim 1 wherein the step of cutting the second member includes cutting the first and second inner bearing segments to respectively include first and second spaced and parallel side faces segments, and first and second end faces extending from the side face segments, and wherein the first and second outer spherical bearing surface segments extend between the side face segments and the end faces.

9. A method in accordance with claim 1 wherein the step of forming the outer bearing member includes forming the outer bearing member with spaced and parallel side faces, wherein the step of cutting the second member includes cutting the first and second inner bearing segments to respectively include first and second spaced and parallel side face segments, and first and second end faces joining the spaced and parallel side face segments, wherein said step of inserting the first inner bearing includes inserting the first inner bearing segment within the outer bearing member in a direction perpendicular to the spaced and parallel side faces of the outer bearing member and with the spaced and parallel side face segments of the first inner bearing segment in generally perpendicular relation to the spaced and parallel side faces of the outer bearing member so as to partially engage the first outer spherical bearing surface segment with the inner concave spherical bearing surface, and thereafter rotating the first inner bearing segment within the outer bearing member so as to locate the spaced and parallel side face segments of the first inner bearing segment in parallel relation to the spaced and parallel side faces of the outer bearing member and so as to fully engage the first outer spherical bearing surface segment with the inner concave spherical bearing surface.

10. A method in accordance with claim 1 wherein the step of forming the outer bearing member includes forming the outer bearing member with spaced and parallel side faces, wherein the step of cutting the second member includes cutting the first and second inner bearing segments to respectively include first and second spaced and parallel side faces segments, and first and second end faces extending from the spaced and parallel side faces segments, and wherein said step of inserting the second inner bearing segment includes inserting the second inner bearing segment within the outer bearing member in a direction perpendicular to the spaced and parallel side faces of the outer bearing member and with the spaced and parallel side faces of the second inner bearing segment in generally perpendicular relation to the spaced and parallel side faces of the outer bearing member and with the end faces of the second inner bearing segment in generally coplanar and spaced relation to the end faces of the first inner bearing segment and so as to partially engage the second outer spherical bearing surface segment with the inner concave spherical bearing surface, and thereafter rotating the second inner bearing segment within the outer bearing member so as to locate the end faces of the second inner bearing segment in abutting relation to the end faces of the first inner bearing segment and so as to fully engage the second inner bearing surface segment with the inner concave spherical bearing surface of the outer bearing member.

11. A method of making a spherical bearing comprising:
forming an outer bearing member with spaced and parallel side faces and an inner concave spherical bearing surface extending between the side faces of the outer bearing member;
forming a second member with spaced and parallel side faces and an outer convex spherical bearing surface fabricated of self-lubricating material and extending between the side faces of the second member;
cutting the second member along a diametric plane extending perpendicularly to the side faces thereof the provide first and second bearing segments respectively including first and second spaced and parallel side faces segments, first and second end faces extending between the side face segments, and first and second outer truncated spherical bearing surface segments extending between the side face segments and the end faces;
inserting the first bearing segment within the outer bearing member in a direction perpendicular to the side faces of the outer bearing member and with the side face segments of the first bearing segment in generally perpendicular relation to the side faces of the outer bearing member and so as to partially engage the first outer truncated spherical bearing surface segment with the inner concave spherical bearing surface;
rotating the first bearing segment within the outer bearing member so as to locate the side face segments of the first bearing segment in parallel relation to the side faces of the outer bearing member so as to fully engage the first outer truncated spherical bearing surface segment with the inner concave spherical bearing surface;
inserting the second bearing segment within the outer bearing member in a direction perpendicular to the side faces of the outer bearing member and with the side face segments of the second bearing segment in generally perpendicular relation to the side face segments of the outer bearing member and with the end faces of the second bearing segment in generally coplanar and spaced relation to the end faces of the first bearing segment and so as to partially engage the second outer truncated spherical bearing surface segment with the inner concave spherical bearing surface; and
rotating the second bearing segment within the outer bearing member so as to locate the end faces of the second bearing segment in abutting relation to the end faces of the first bearing segment and so as to fully engage the second outer truncated spherical bearing surface segment with the inner concave spherical bearing surface of the outer bearing member.

12. A method in accordance with claim 11 wherein the step of forming the second member also includes forming the second member with a bore extending perpendicularly to the side faces.

13. A method in accordance with claim 11 wherein the step of forming the second member also includes forming the second member with a cylindrical bore extending perpendicularly to the side faces.

14. A method in accordance with claim 11 wherein the step of forming the second member also includes forming the second member with a non-cylindrical bore extending perpendicularly to the side faces.

15. A method in accordance with claim 11 wherein forming the second member includes
fabricating an inner supporting layer of a fiberglass epoxy resin matrix which includes an outer, outwardly convex, truncated spherical surface;
placing a fabric of self-lubricating material on the outer, outwardly convex, truncated spherical surface of the inner supporting layer to partially form an outer layer of self-lubricating material;
placing a second layer of fiberglass filaments and epoxy resin on the outer layer of self-lubricating material so as to conform the outer layer of self-lubricating material to the outer, outwardly convex, truncated spherical surface of the inner supporting layer;
curing said second layer of fiberglass filaments and epoxy resin to form an outer layer of fiberglass epoxy resin matrix and bond the outer layer of self-lubricating material to both the inner supporting layer of fiberglass epoxy resin matrix and the outer layer of fiberglass epoxy resin matrix;
removing said outer layer of fiberglass epoxy resin matrix to expose the outer layer of self-lubricating material, and forming the outer layer of self-lubricating material with the outer convex spherical bearing surface.

* * * * *